INVENTORS.
WILLIAM J. McDONALD
EDWARD B. BYNUM, JR.
WILLIAM E. CRONQUIST
J. T. COMFORT

ATTORNEY

FIG.3
AMPLIFIER
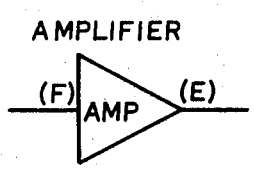
FIG.3A
AND NOT
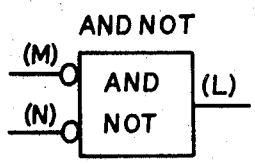
FIG.3B
COUNTER
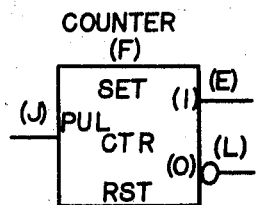
FIG.3C
OR CIRCUIT
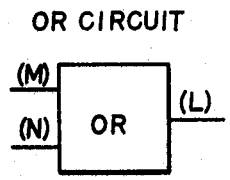
FIG.3D
RELAY COIL
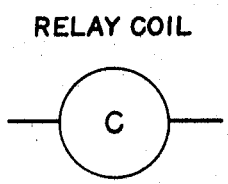
FIG.3E

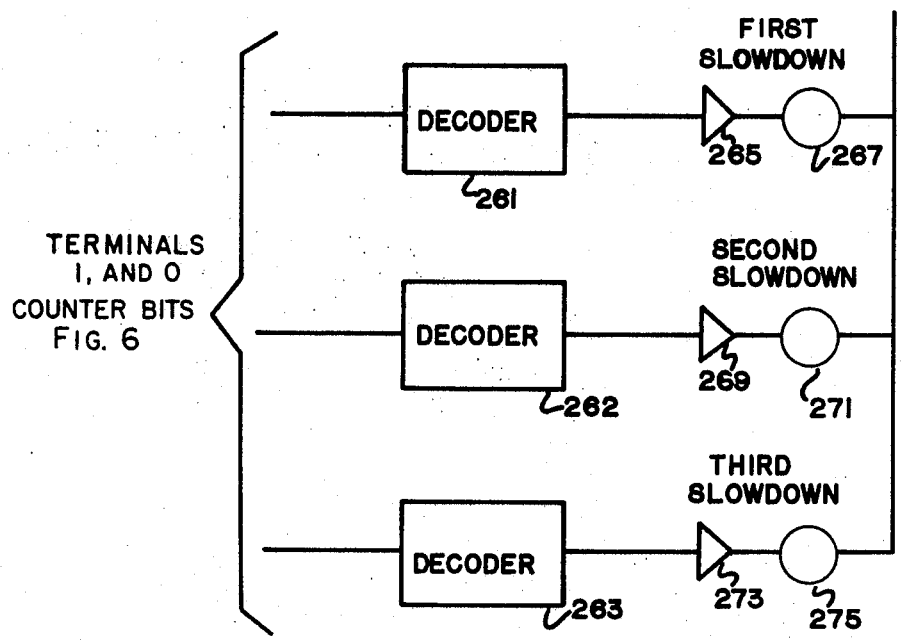

3,425,515
DIGITAL CONTROL FOR MINE HOIST SYSTEM
William J. McDonald, Schenectady, N.Y., and Edward B. Bynum, Jr., and William E. Cronquist, Roanoke, Va., assignors to General Electric Co., a corporation of New York
Filed June 15, 1964, Ser. No. 375,173
U.S. Cl. 187—29    3 Claims
Int. Cl. B66b 1/30

This invention is directed to a mine hoist system of any type for controlling the movement of a conveyance between levels in the mine shaft or on a hoisting slope.

Very briefly, then, in this invention, a conveyance such as a skip or a cage or skip-cage combination, travels in a mine shaft or on a hoisting slope between different levels. The trip that a conveyance is to make is selected, and the distance between the levels is entered into a primary counter. As the conveyance moves toward the selected level, the count in the primary counter is reduced accordingly. When the count in primary counter has been reduced to a predetermined count, indicating that the conveyance is a predetermined distance from the selected level, the conveyance is slowed down.

It is therefore an object of this invention to provide a new and improved mine hoist system for controlling the movement of a conveyance in a mine shaft or on a hoisting slope.

Another object of this invention is to provide a new and improved mine hoist system for automatically controlling the travel of a conveyance in a mine shaft or on a hoisting slope.

It is another object of this invention to provide a new and improved mine hoist system of any type for automatically slowing down the conveyance in a mine shaft or hoisting slope as the conveyance approaches the level at which it is to stop.

The invention is set forth with particularity in the appended claims. The principles and characteristics of the invention, as well as other objects and advantages are revealed and discussed through the medium of the illustrative embodiments appearing in the specification and drawings which follow.

In the drawings:

FIGS. 3a through 3e shows the symbols used in the schematic of the control.

FIG. 7 shows the slowdown control.

Figure 1:
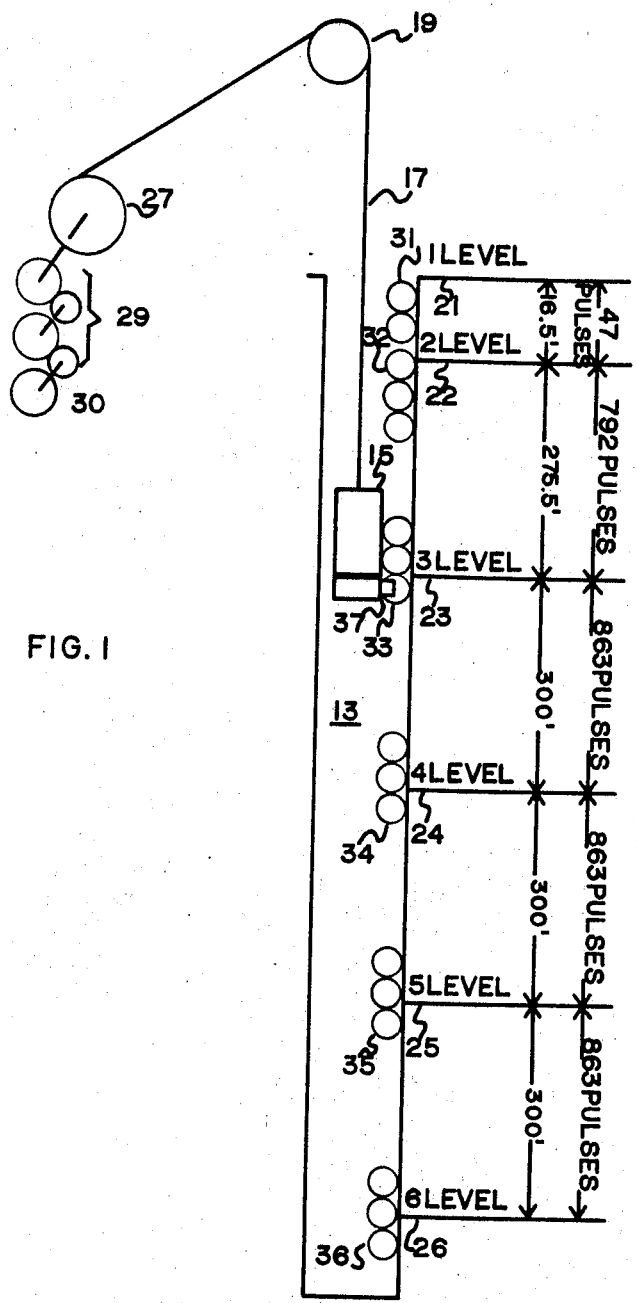
FIG. 1 shows a schematic of a mine shaft with several levels, and a conveyance.

Refer now to FIG. 1 for a description of a schematic of a mine hoist. The mine shaft 13 includes six levels 21–26. The levels are separated from each other as indicated. A cage 15 is suspended by a cable 17 from a headsheave 19 in the mine shaft 13. The cage may be moved from one level to another by winding or unwinding the cable 17 about the hoist drum 27. The hoist drum 27 is rotated by motor 30 through gearing 29.

Each level has a magnetic sensor 31–36 positioned just below and at each level. A vane of magnetic material 37 is attached to the cage 15 so that it passes through each magnetic sensor 31–36. The control equipment which will be described with relation to FIG. 2 slows the cage down as it approaches a selected level, but does not stop the cage. The sensing of the vane 37 on the cage by a sensor 31–36 after the cage has been slowed down actually stops the motor 30 to stop the cage 15 at the sensed level.

Figure 2:
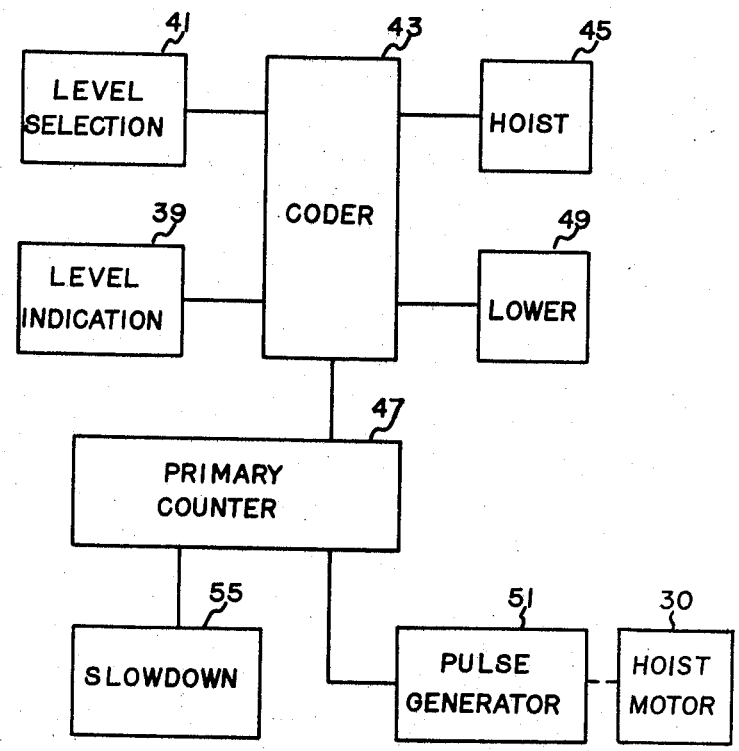
FIG. 2 shows a block diagram of a control for a mine hoist constructed according to this invention.

Refer now to FIG. 2 for a description of the control equipment for controlling the movement of the cage between different levels. The level at which the cage rests is indicated by the level indicator 39 and the selector level to which the cage is to move is indicated by the level selection 41. The level selection 41 and the level indication 39 are connected to the coder 43 to code the combination of the signals indicating the level at which the cage is resting and level to which the cage is to move, providing a trip signal indicating the direction and the specific trip that the cage is to take. The term "trip" indicates between which two levels the cage will move.

If the direction of the trip is upward, a hoist signal is applied to the hoist control 45 to start the motor moving the cage upwards. A signal indicating the specific trip that the cage will take is applied to the primary counter 47 to set the primary counter to a count indicating the distance of the trip. If the direction of the trip is downwards, a lower signal is applied to the lower control 49 to start the motor moving the cage downwards. A signal is also applied to the primary counter 47 to set the primary counter to a count indicating the distance of the trip.

The pulse generator 51 is connected to the hoist motor 30 in such a manner that it generally pulses as the hoist motor moves the cage with a predetermined number of pulses generated for each foot that the cage moves. The pulses generated by pulse generator 51 are applied to primary counter 47.

The primary counter 47 is connected to the slowdown control 55 in such a manner that the slowdown control 55 will slow down the hoist motor when the primary counter 47 has counted down to a predetermined number indicating that the cage is a predetermined distance from the selected level. The slowdown control can be so connected to slow down the hoist motor to a first reduced speed when the cage is a first distance from the selected level, to slow down the hoist motor to a second reduced speed when the cage is a second distance from the selected level, and to slow down the hoist motor to a third reduced speed when the cage is a third distance from the selected level. The cage is then traveling at a very slow speed, and is finally stopped when one of the magnetic sensors 31–36 in FIG. 1 senses the presence of the vane 37 on the cage 15.

To further understand the invention, assume that the cage is resting at level 1, and is to make a trip to level 6 in FIG. 1. The level indication 39 in FIG. 2 indicates that the cage is now at level 1, and the level selection 41 indicates that the cage is to travel to level 6. The signals indicating the level the cage is resting at and the level to which the cage is to travel are combined in coder 43 to produce a signal which is applied to lower control 49 and to produce a trip signal indicating that the cage is to travel from level 1 to level 6.

The lower signal applied to the lower control 49 causes the lower control to start the movement of the cage downwards. The trip signal (level 1 to level 6) applied to the primary counter 47 sets a count in the primary counter indicating the distance between level 1 and level 6. Looking at FIG. 1, the count set into the primary counter would be 3430. As the hoist motor 30 moves the cage 15 down, the pulse generator 51 in FIG. 2 generates pulses in synchronism with the movement of the cage. 2.878 pulses are generated for every foot that the cage moves in the shaft. The pulses generated by pulse generator 51 are applied to primary counter 47 to reduce the count therein. In this manner the count in the primary counter 47 is reduced according to the distance that the cage moves in the shaft.

The cage travels at a relatively high speed following acceleration until it approaches the selected level at which it is to stop. The slowdown control 55 is connected to the primary counter in such a manner that when the primary counter has counted down to a first predetermined number indicating that the cage is at a first predetermined distance from the selected level, the slowdown control 55 initiates the slowdown of the cage to a first slowdown speed slower than the speed at which the cage normally travels. The cage is again slowed down to a second, and then to a third slowdown speed, each of which is slower than the preceding speed as the cage approaches the selected level. These signals may be fed into a rate circuit to provide a linear deceleration.

When the cage 15 in FIG. 1 reaches level 6 the magnetic sensor 36 senses the vane 37 on the cage 15, and stops the motor 30 to stop the cage 15 at level 6.

SYMBOLS AND NOMENCLATURE

In the following detailed description, the term "one signal" when used refers to a −6 volt signal and the term "zero signal" refers to a 0 volt signal or ground potential.

The symbols used in FIGS. 3a through 3e and described hereinafter are used in the detailed description of the identification system.

In all of the elements shown, input terminals are usually shown on the left side of the symbols and output terminals are shown on the right side of the symbols.

AMPLIFIER

FIG. 3a shows the symbol for the amplifier. A one signal on the input terminal will cause current to flow in a load connected between the output terminal and the negative power bus.

AND/NOT CIRCUIT

FIG. 3b shows the symbol for the AND/NOT circuit. Its operation is such that a zero signal on all input terminals causes a one signal to be produced on the output terminal. This unit may have two or more input terminals. Positive pulses received on all terminals are effectively the same as zero signals received and cause a one signal to be produced on the output terminal. If a one signal is applied to one or more input terminals, a zero signal is produced on the output terminal.

COUNTER

FIG. 3c shows the symbol for a counter bit. A one signal applied to the SET terminal sets the counter bit to one, so that a one signal appears at the "1" output terminal and a zero signal at the "0" terminal. This one signal at the "1" output terminal will be maintained after the set signal is removed and remains until a one signal is applied to the RST (reset) terminal, at which time the one signal at the "1" output terminal becomes a zero signal; and a one signal appears at the "0" output terminal. The counter bit will remain in this, the zero state or reset state, until a one signal is again applied to the SET terminal. In addition, a positive pulse received on the PUL input terminal will complement the counter bit, changing the state of the counter bit from the previous state. The shift of the counter bit will occur on the positive going side of the input pulse. The "1" and "0" output terminals are always the inverse of each other unless a one signal is simultaneously applied to the SET and RST (reset) terminal, in which case, a zero output signal will be present on both output terminals.

"OR" CIRCUIT

FIG. 3d shows a symbol for an OR circuit. Its operation is such that a one signal on either input terminal will produce a one signal on the output terminal. This symbol may have two or more input terminals.

RELAY COIL

FIG. 3e shows the symbol used for a coil of a relay. The relay coil is energized by applying a one signal to the coil.

Figure 4:
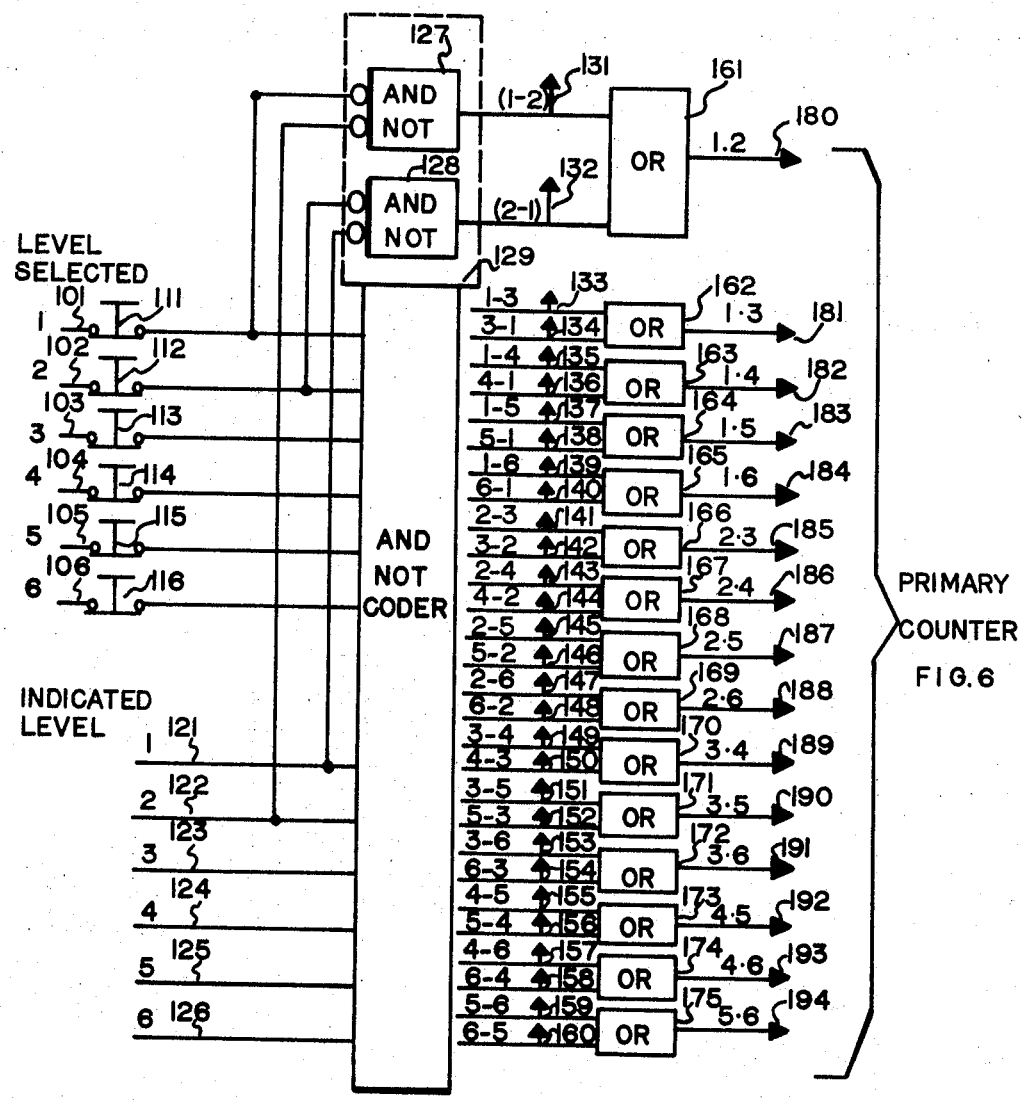
FIG. 4 shows the control for selecting the trip that the cage will take in the mine shaft.

Referring now to FIG. 4 for a detailed description of the control system, the level at which the cage rests is indicated by applying a zero signal to the appropriate terminal 121–126, for levels 1–6, respectively. One signals are normally applied to terminals 121–126, and to terminals 101–106. Pushbuttons 111–116 may be pushed to select the levels to which the cage is to be moved. Terminals 101–106 and 121–126 are connected to AND/NOT coder 129.

AND/NOT coder 129 contains a plurality of AND/NOT circuits such as the two AND/NOTS 127 and 128 shown. Each of the AND/NOTS are connected to a terminal selected from terminals 101–106 and to a terminal selected from terminals 121–126, so that each AND/NOT is connected to one terminal which selects the level to which the cage may be moved, and to one terminal which indicates the level at which the cage is. For instance AND/NOT 127 is connected to terminal 101 (level 1 selection), and to terminal 122 (level 2 indication). AND/NOT 128 is connected to terminal 102 (level 2 selection), and to terminal 121 (level 1 indication). The two terminals that an AND/NOT are connected to indicate the trip that the cage may take from the indicated level to the selected level.

The AND/NOTS in the AND/NOT coder 129, such as AND/NOTS 127 and 128 produce a signal from output terminals 131–160 indicating the trip and the direction of the trip that the cage will take from the indicated level to the selected level. The direction of the trip is indicated by the first appearing numeral indicating the level at which the trip starts, and the second appearing numeral indicating the level to which the cage is to move. For instance, the indication 2–1 on terminal 132 indicates that the cage is at level 2 and is to move to level 1.

Two terminals indicating trips between two levels are applied to common OR circuits 161–175, with the OR circuits 161–175 producing signals on terminals 180–194 indicating the trip that a cage will take, without indicating the direction of the trip. For instance terminal 157 (with an indication of 4–6, indicating movement of the cage from level 4 to level 6) and terminal 158 (with an indication of 6–4, indicating movement of the cage from level 6 to level 4) are both connected to OR 174, which will produce a signal on terminal 193 when a signal is applied on either terminal 157 or 158 indicating a trip between level 4 and level 6 without indicating the direction of the trip.

Figure 5:
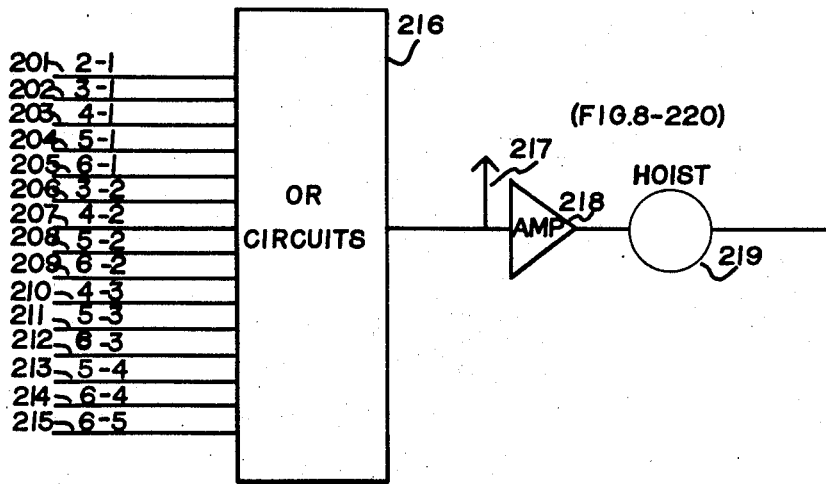
FIG. 5 shows the control for initiating the movement of the cage in the mine shaft.
Figure 5:
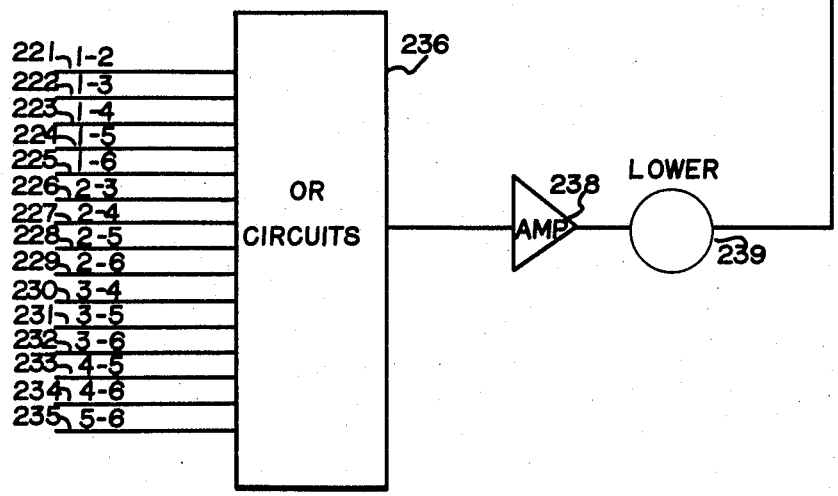

Referring now to FIG. 5, those terminals in FIG. 4 indicating an upward trip of the cage are connected to terminals 201–215; i.e., terminal 132 in FIG. 4 connects to terminal 201 in FIG. 5, and terminal 134 in FIG. 4 connects to terminal 202 in FIG. 5, and those terminals indicating a downward trip of the cage are connected to terminals 221–235; i.e., terminal 131 in FIG. 4 connects to terminal 221 in FIG. 5 and terminal 133 in FIG. 4 connects to terminal 222 in FIG. 5. Terminals 201–215 are connected through a plurality of OR circuits, indicated as one block of OR circuits 216 through amplifier 218 to a hoist coil 219. Terminals 221–235 are connected through a plurality of OR circuits, indicated as one block of OR circuits 236 through amplifier 238 to a lower coil 239.

TABLE 1.—PRIMARY COUNTER PROGRAM

| Trip Selected | Distance | No. Pulses | Counter Bit Set ||||||||||||
|---|---|---|---|---|---|---|---|---|---|---|---|---|---|---|
| | | | 1 | 2 | 3 | 4 | 5 | 6 | 7 | 8 | 9 | 10 | 11 | 12 |
| | | | 1 | 2 | 4 | 8 | 16 | 32 | 64 | 128 | 256 | 512 | 1024 | 2048 |
| 1-2 | 16.5 | 47 | X | X | X | X | | X | | | | | | |
| 2-3 | 275.6 | 792 | | | | X | X | | | | X | X | | |
| 1-3 | 292.0 | 840 | | | | X | | X | | | X | X | | |
| 3-4 | 300.0 | 863 | X | X | X | X | X | X | | | X | X | | |
| 4-5 | 300.0 | 863 | X | X | X | X | X | X | | | X | X | | |
| 5-6 | 300.0 | 863 | X | X | X | X | X | X | | | X | X | | |
| 2-4 | 575.6 | 1654 | | X | X | | X | X | X | | | X | X | |
| 1-4 | 592.0 | 1703 | X | X | X | | | X | | X | | X | X | |
| 3-5 | 600.0 | 1726 | | X | X | X | X | X | | X | | X | X | |
| 4-6 | 600.0 | 1726 | | X | X | X | X | X | | X | | X | X | |
| 2-5 | 875.5 | 2520 | | | | X | X | | X | X | X | | | X |
| 1-5 | 892.0 | 2567 | X | X | X | | | | | | | X | | X |
| 3-6 | 900.0 | 2590 | | X | X | X | | | | | | X | | X |
| 2-6 | 1,175.5 | 3383 | X | X | X | | X | X | | | X | | X | X |
| 1-6 | 1,192.0 | 3430 | | X | X | | X | X | | X | | | X | X |
| Slowdown ||||||||||||||||
| #1 SD | 61.45 | 214 | | X | X | | X | | X | X | | | | |
| #2 SD | 19.30 | 56 | | | | X | X | X | | | | | | |
| #3 SD | 6.65 | 19 | X | X | | | X | | | | | | | |

Pulses/Foot=2.878.
Slowdown relays are de-energized when number in counter falls below that shown.

Figure 6:
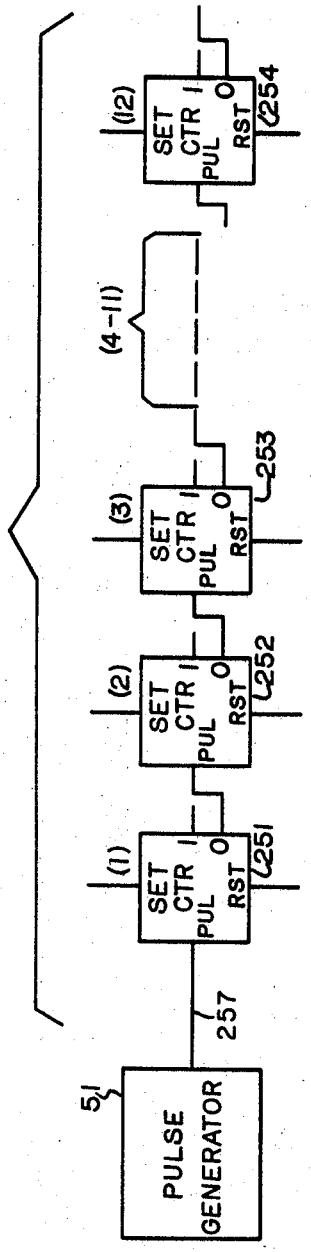
FIG. 6 shows the primary counter in which the distance of the trip of the cage is stored.

Referring now to FIG. 6, a binary counter is shown which is set to a count indicating the distance to be traveled between the two levels by the cage. Pulse generator 51 is connected to the counter. The binary counter is a twelve bit binary counter, termed the primary counter, composed of twelve identical counter bits. For the purposes of this description, only the first three and last counter bits 251–254 are shown, with the understanding that the fourth through the eleventh counter bits are identical to those shown. The primary counter is set to a count indicating the distance to be traveled between the two levels by output terminals 180–194. This is accomplished by connecting each output terminal 180–194, through a diode matrix, to the SET input terminal of each counter bit which should be set to ONE to indicate the distance of the trip. For instance, as shown in Table 1, for the trip between levels 1 and 2, the distance is 16.5 feet, which is represented by a count of 47 taking 2.878 pulses per foot. Therefore, for the trip between level 1 and level 2, output terminal 180 in FIG. 4 applies a signal to the SET terminals of the first, second, third, fourth, and sixth counter bits of the primary counter shown in FIG. 6 to set the primary counter to a count of 47. The other output terminals 180–194 are applied to the SET terminals of the primary counter bits to set the primary counter as shown in Table 1.

The primary counter shown in FIG. 6 is a step down counter with the counter counting down one for each pulse applied to terminal 257. The zero terminal of each counter bit is connected to the PUL input terminal of the succeeding counter bit to effect this countdown. For example assume that counter bits 251–253 are set to ONE, indicating a decimal number 7. The first positive pulse applied to terminal 257 causes counter bit 251 to be reset to ZERO, and counter bits 252 and 253 remain set to ONE, indicating a decimal number six. The next positive pulse applied to terminal 257 causes counter bit 251 to be set to ONE, with the negative signal from its ZERO output terminal going positive to reset counter bit 252 to ZERO. Counter bit 253 remains set to ONE, with the 101 of the three counter bits 251–253 indicating a decimal number five. The countdown continues with a countdown of one for each positive pulse applied to terminal 257.

The ONE and the ZERO output terminals of the counter bits in the primary counter shown in FIG. 6 are connected in a predetermined manner to decoders 261–263 to effect three different slowdowns of the cage during its travel from level to level. The distance and corresponding count for each of the three slowdowns are shown in Table 1. To effect the first slowdown, the ZERO output terminals of the 1, 4, 6, 9, 10, 11, and 12 counter bits and the ONE terminals of the 2, 3, 5, 7, and 8 counter bits are connected to decoder 261. Therefore, when the primary counter has counted down to a count of 214 as indicated in Table 1, decoder 261 produces a signal which is amplified by amplifier 265 to energize relay coil 267 to effect the first slowdown.

To effect the second slowdown, the ZERO terminals of the 1, 2, 3, 7, 8, 9, 10, 11, and 12 counter bits and the ONE terminals of the 4, 5, and 6 counter bits are connected to decoder 262. Decoder 262 produces a signal when the inputs indicate a count of 56 in the primary counter which is amplified by amplifier 269 to energize relay coil 271 to effect the second slowdown.

To effect the third slowdown the ZERO terminals of the 3, 4, 6–12 counter bits and the ONE terminals of the 1, 2, and 5 counter bits are connected to decoder 263. Decoder 263 produces a signal when the input indicates a count of 19 in the primary counter which is amplified by amplifier 273 to energize relay coil 275 to effect the third slowdown.

Decoders 261–263 are standard decoders composed of AND/NOT circuits and OR circuits which take the combination of outputs from the ZERO and ONE output terminals of a counter and produce one output signal when the inputs to the AND/NOT and OR circuits are in predetermined conditions.

Pulse generator 51 in FIG. 6 is connected to the main drive motor to produce 2.878 pulses for every foot that the cage moves in the shaft. This is accomplished by attaching a plurality of vanes to the shaft of the motor which move through a movement sensing device. The movement sensing device p-n causes the pulse generator to produce one pulse every time it senses a vane. The vanes are attached to the motor shaft in a manner to cause the pulse generator to produce 2.878 pulses for every foot that the motor moves the cage in the shaft.

Pulse generator 51 applies positive pulses to the PUL input of counter bit 251.

OPERATION
Movement between levels

Assume for the purposes of this description of the operation that the cage is now at level 6 and is to be moved to level 1. Refer first to FIG. 4. Pushbutton 111 is pushed to select the first level, applying a signal to the AND/NOT coder 129, where it is combined with the signal applied from terminal 126 indicating that the cage is now at level 6. AND/NOT coder 129 produces a one output signal on terminal 140 indicating that the movement of the cage will be from level 6 to level 1. The one signal from terminal 140 is applied to terminal 205 in FIG. 5, passed by OR circuits 216, amplified by amplifier 218, to energize the hoist relay coil 219. The hoist relay coil 219, when energized, starts the hoist motor moving the cage upwards.

The one signal on terminal 140, FIG. 4, is also passed through OR 165 and applied from output terminal 184 through the diode matrix to the primary counter shown in FIG. 6. As indicated in Table 1, the terminal 184 applies a one signal to the set terminals of the 2, 3, 6, 7, 9, 11 and 12 counter bits of the primary counter to set the primary counter to a decimal count of 3430 to provide for a distance of 1192 feet between the sixth and first levels.

The hoist relay coil 219 has now been energized to raise the cage from the sixth to the first level, and the primary counter in FIG. 6 has been set for a trip of 1192 feet.

The shaft of the hoist motor begins to rotate and the vaned rotor driven by the motor passes through the pulse generator 5, so that the pulse generator 51 in FIGURE 6 produces 2.878 positive pulses for every foot of travel of the cage in the shaft. The positive pulses produced by the pulse generator 51 are applied to the PUL terminal of counter bit 251 of the primary counter to cause the count of decimal 3430 to be counted down by one to a decimal 3429.

As the hoist motor continues to move the cage upwards, the pulses generated by the pulse generator 51 continue to reduce the count in the primary counter shown in FIG. 6. When the count is reduced to a decimal 214 as shown in Table 1, decoder 261 in FIG. 7 produces a one signal, amplified by amplifier 265, to energize the first slowdown relay coil 267. The first slowdown relay coil 267, when energized, causes the hoist motor to slow down to a first slow speed. At this point, the cage is still 61.45 feet from the first level as indicated by Table 1.

The cage travels at the first slowdown speed until the count is reduced to a count of 56 as indicated by Table 1, where the decoder 262 is energized, producing a one signal, amplified by amplifier 269, to energize the second slowdown relay coil 271. The energization of the second slowdown relay coil 271 causes the hoist motor to slow down to a second slowdown speed when it is 19.30 feet from the first level, as indicated by Table 1.

The cage travels at the second slowdown speed until the count is reduced to a count of 19, when the cage is 6.65 feet from the first level, as indicated by Table 1. When the count is 19, the third decoder 263 produces a one signal, which is amplified by amplifier 273 to energize the third slowdown relay coil 275. The energization of the third slowdown relay coil 275 causes the hoist motor to slow down to a third slowdown speed which is almost a creep. The third slowdown speed continues until a magnetic stop switch at the exact level senses a vane attached to the cage to indicate that the cage is at the first level. The sensing of the vane by the stop switch causes the hoist motor to stop the cage at the first level.

After the cage has stopped at the first level, the primary counter in FIG. 6 may be reset by applying a signal to the RST terminals of all of the counter bits.

The cage may now be moved to another level by the pushing of another pushbutton 111–116 in FIG. 4 in the same manner as that described.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. In a mine hoist system wherein a hoist motor moves a conveyance from one level to another level in a mine shaft, a register for indicating the distance of a trip between selected levels, digital means responsive to the register for establishing a count proportional to the distance of the trip, means responsive to the movement of the conveyance for changing the count contained in said digital means, and more controlling means responsive to one or more predetermined changes of the count to alter the speed of the hoist motor in one or more increments, thereby altering the rate of movement of the conveyance.

2. In a mine hoist system of the type recited in claim 1, motor controlling means further defined as including a plurality of means, each responsive to a different predetermined change in the count contained in said digital means to alter the speed of the hoist motor by a predetermined increment.

3. In a mine hoist system wherein a hoist motor moves a conveyance from one level to another level in a mine shaft, a register for indicating the distance of a trip between selected levels, digital means responsive to the register for establishing a count proportional to the distance of the trip, means responsive to the movement of the conveyance for changing the count contained in said digital means, and motor controlling means responsive to one or more predetermined changes of the count to reduce the speed of the hoist motor in one or more increments to control the rate of deceleration of the conveyance.

References Cited
UNITED STATES PATENTS

| | | |
|---|---|---|
| 3,323,030 | 5/1967 | Inaba et al. |
| 2,537,427 | 1/1961 | Seid et al. _____ 318—28 |
| 2,727,194 | 12/1955 | Seid _____ 318—28 |
| 2,878,434 | 3/1959 | Brown _____ 318—28 |
| 3,146,858 | 9/1964 | Leroux et al. _____ 187—29 |
| 3,211,976 | 10/1965 | Brule et al. _____ 318—18 |
| 2,474,861 | 7/1949 | Putt _____ 187—29 |
| 2,736,852 | 2/1956 | Nelson _____ 318—20 |
| 2,907,937 | 10/1959 | Apgar et al. _____ 318—20 |
| 2,959,074 | 8/1960 | Hallahan _____ 318—20 |
| 2,979,972 | 4/1961 | Danly _____ 318—20 |
| 3,146,857 | 9/1964 | Bosshard _____ 187—29 |

ORIS L. RADER, *Primary Examiner.*

G. SIMMONS, *Assistant Examiner.*

U.S. Cl. X.R.

318—18